(12) United States Patent
Kan et al.

(10) Patent No.: US 8,291,734 B2
(45) Date of Patent: Oct. 23, 2012

(54) VEHICULAR LOCK DEVICE

(75) Inventors: Takahiro Kan, Toyota (JP); Kazumutsu Azuma, Aichi (JP)

(73) Assignee: Toyota Shatai Kabushiki Kaisha, Aichi (JP)

( * ) Notice: Subject to any disclaimer, the term of this patent is extended or adjusted under 35 U.S.C. 154(b) by 311 days.

(21) Appl. No.: 12/519,761

(22) PCT Filed: Jun. 9, 2008

(86) PCT No.: PCT/JP2008/060527
§ 371 (c)(1),
(2), (4) Date: Jan. 21, 2010

(87) PCT Pub. No.: WO2008/150008
PCT Pub. Date: Dec. 11, 2008

(65) Prior Publication Data
US 2010/0133870 A1    Jun. 3, 2010

(30) Foreign Application Priority Data

Jun. 7, 2007  (JP) .................................. 2007-151360
Sep. 4, 2007  (JP) .................................. 2007-229137

(51) Int. Cl.
*B60J 7/00*   (2006.01)

(52) U.S. Cl. ...................................... 70/268; 296/65.16

(58) Field of Classification Search ............... 296/65.01, 296/65.16, 65.17; 70/267, 268, 269; 297/378.13
See application file for complete search history.

(56) References Cited

U.S. PATENT DOCUMENTS

| 6,733,078 | B1 * | 5/2004 | Zelmanov ................... 297/378.1 |
| 7,210,713 | B2 * | 5/2007 | Yoshida et al. ................ 292/201 |

FOREIGN PATENT DOCUMENTS

| JP | 9-81028 A | 3/1997 |
| JP | 2539420 Y | 4/1997 |
| JP | 9-325280 A | 12/1997 |
| JP | 2005-113371 A | 4/2005 |
| JP | 2007-284020 A | 11/2007 |

* cited by examiner

*Primary Examiner* — Joseph Pape
(74) *Attorney, Agent, or Firm* — SOLARIS Intellectual Property Group, PLLC

(57) ABSTRACT

A stowable vehicle seat, which is stowed by folding a seat back toward the side of a seat cushion, releasing a floor lock while the seat back is in a superposed state on the seat cushion, and lifting the vehicle seat up toward the vehicle body side. The vehicle seat is fixed by connecting a striker disposed on the back face of the seat back with a dragger unit disposed on the vehicle body side. After an operation to release locking of the dragger unit, separation of the striker from the dragger unit is estimated, and a dragger motor is driven so that a latch of the dragger unit is moved to the initial position.

6 Claims, 14 Drawing Sheets

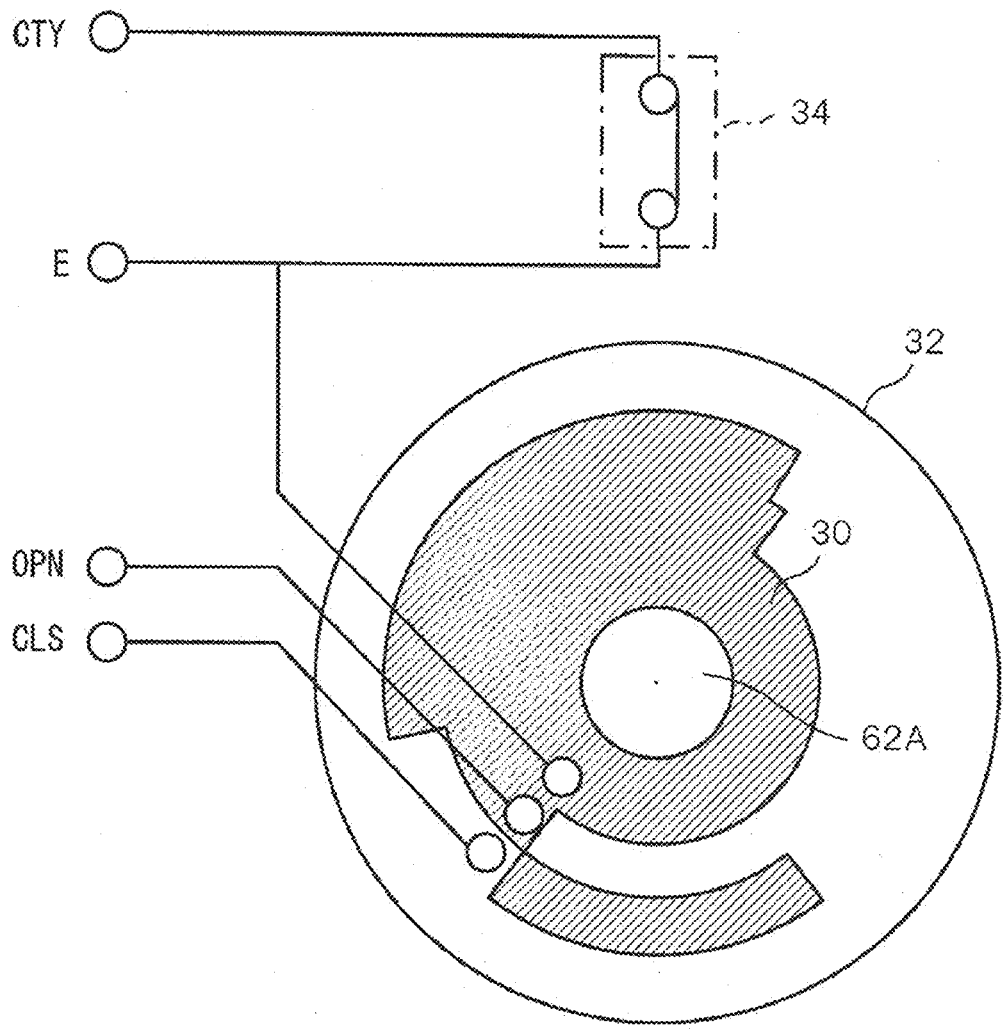

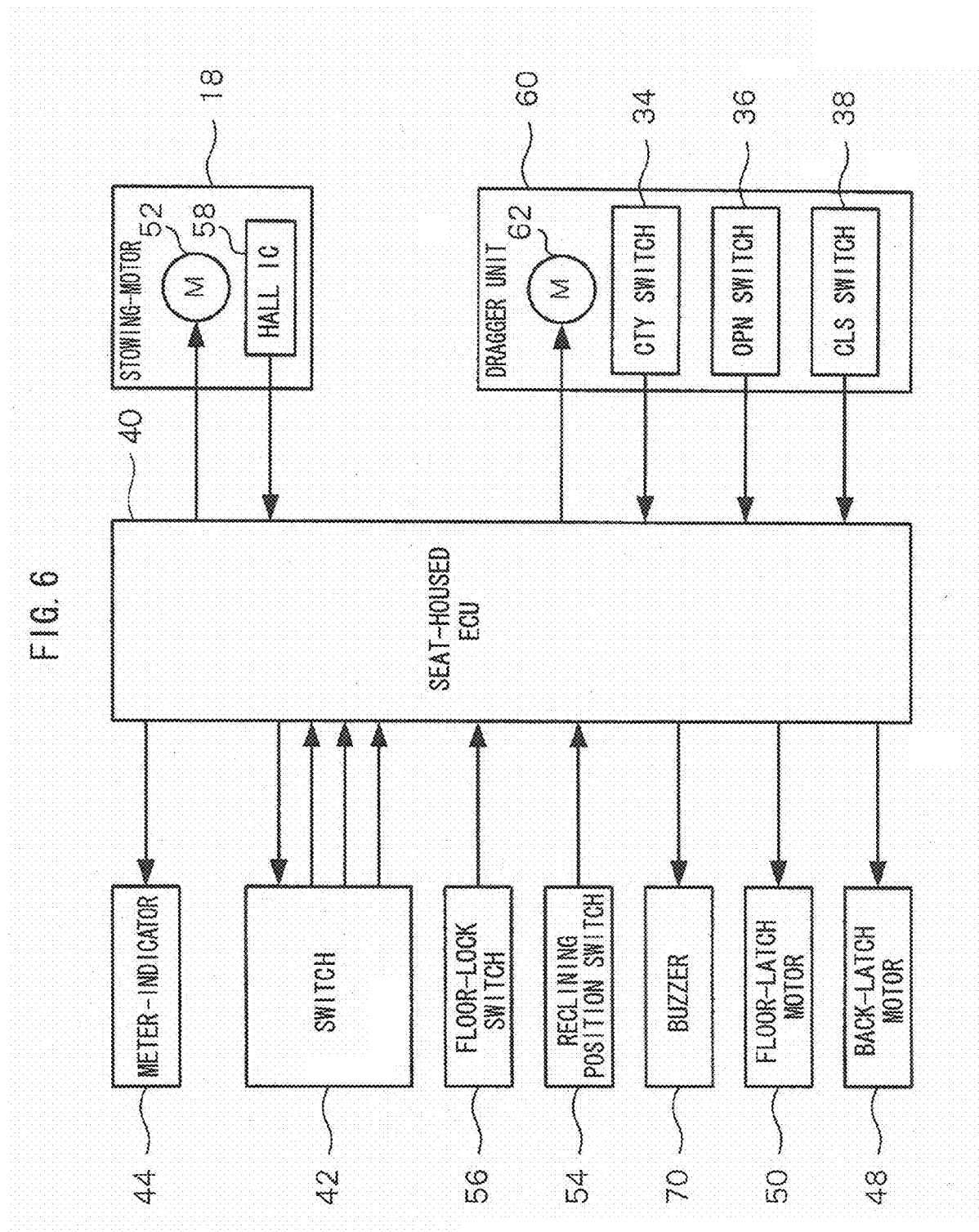

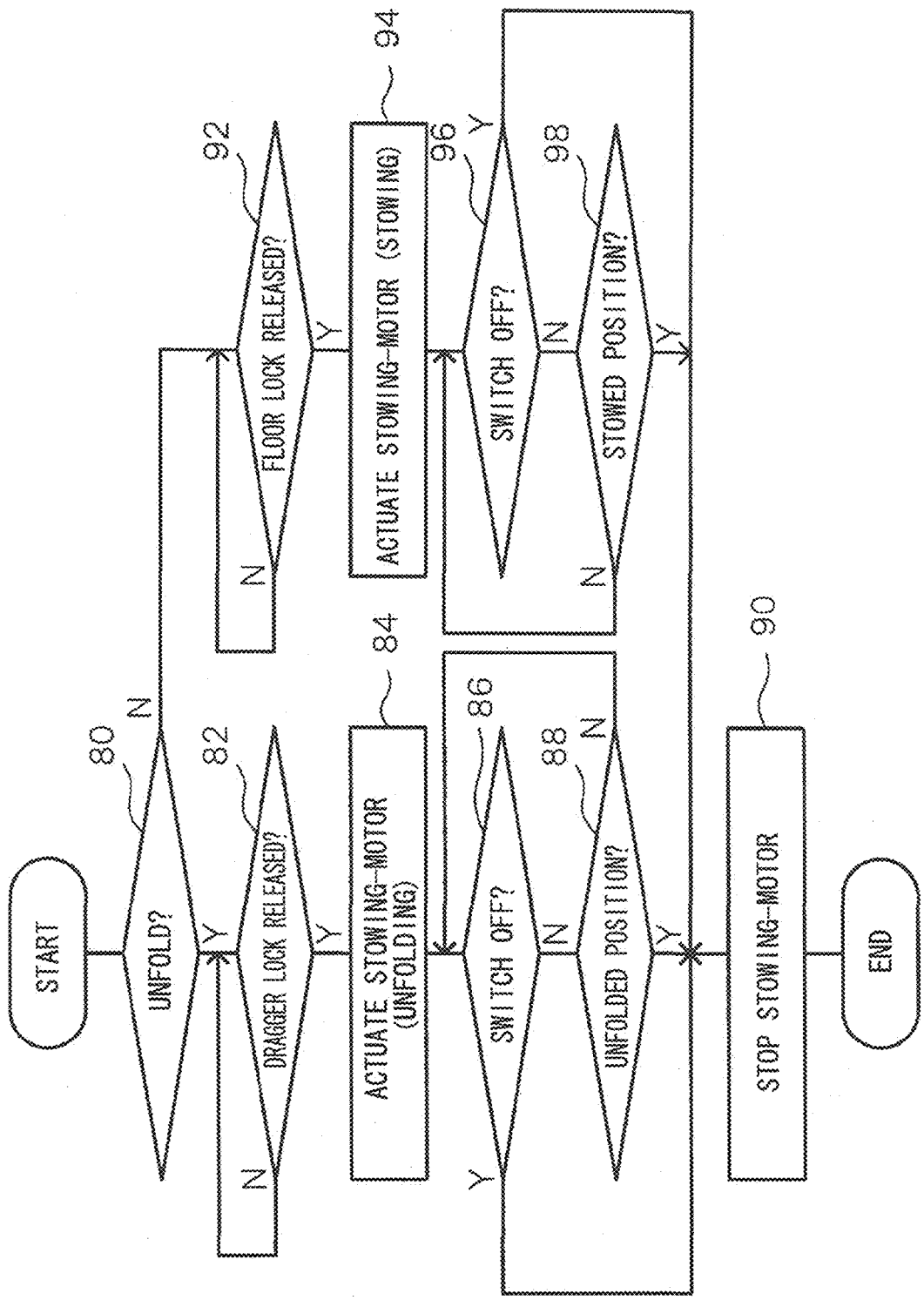

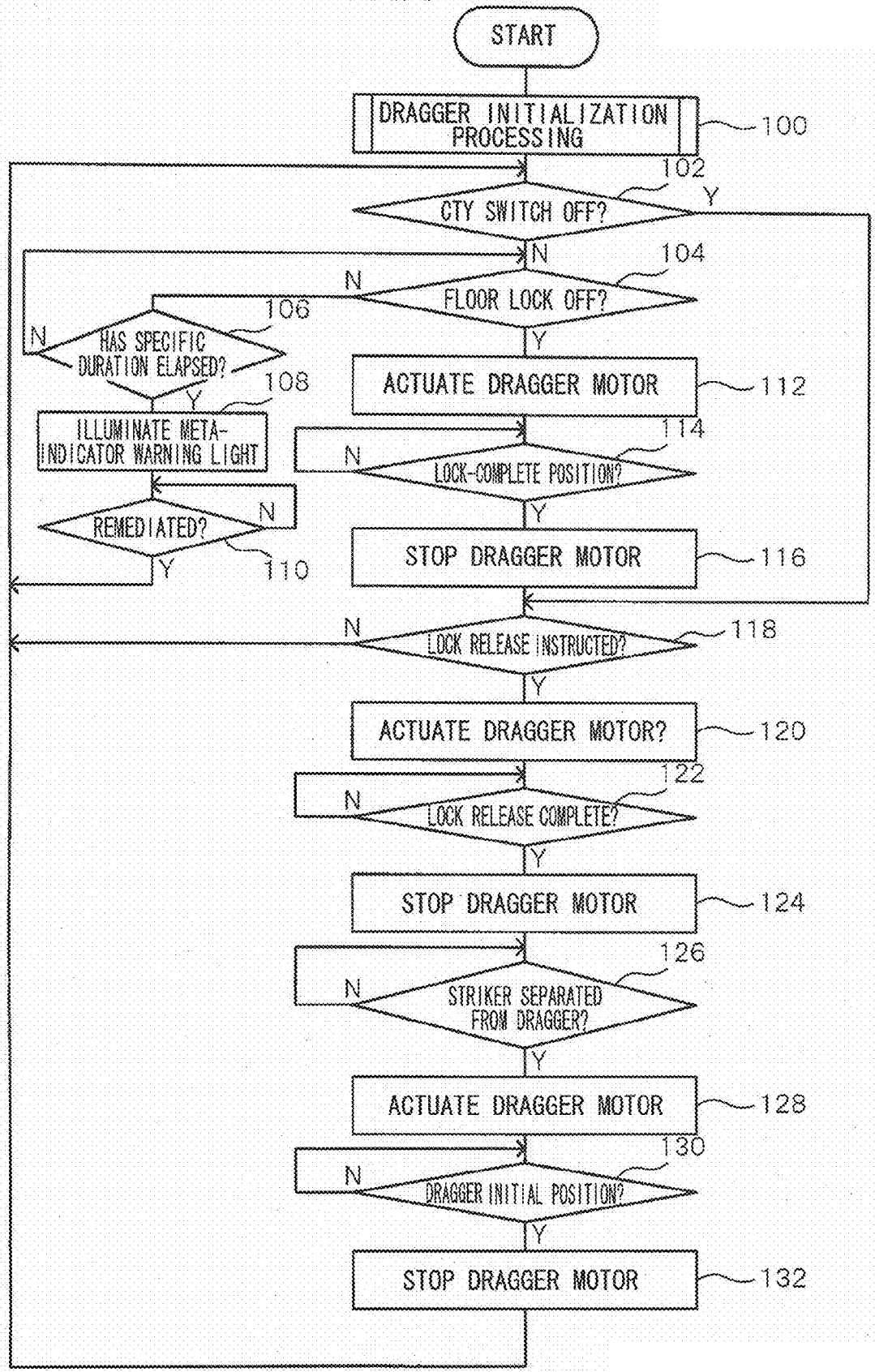

VEHICULAR LOCK DEVICE

TECHNICAL FIELD

The present invention relates to a vehicular lock device, and in particular to a vehicular lock device utilizing an electrical lock mechanism, such as one used in a back door or trunk.

RELATED ART

In electrical lock devices used in back doors and trunks, when the back door or trunk has been closed and a striker has been inserted into the lock device, a motor is actuated pulling in and locking the striker. When releasing of the lock is instructed in such lock devices, by a release switch or the like, the motor is actuated and locking of the striker is released by performing a lock release operation. Then when the lock has moved to a release position the striker is separated from the lock device by use of a spring or the like.

However, some vehicles with a load chamber such as wagons, vans and one-box cars are vehicles being capable of effectively using the load chamber by having stowable vehicle seats, such as rear seats that flip up toward the vehicle body side.

For example, technology described in Japanese Utility Model Registration No. 2539420 proposes a flip-up mechanism for foldable seats with electrical operation utilized to recline the vehicle seats and raise the vehicle seats toward the vehicle body side. The vehicle seats are flipped up and toward the vehicle body side and stowed electrically, and so seat storage and unfolding operations can be performed easily, without burden to an operator.

However, the technology described in Japanese Utility Model Registration No. 2539420 does not mention fixing when the vehicle seats are in a stowed state toward the vehicle body side, and when vibrations or the like during travelling are considered the provision of a lock device would be preferable to fix the vehicle seats when stored.

In order to address this, consideration may be made to applying the above described electrical lock devices used for back doors, trunks or the like in order to maintain the stowed state of the vehicle seat. However, thought is required in order to perform appropriate locking operation when such electrical lock devices for back doors, trunks or the like are applied to other locations.

DISCLOSURE OF THE INVENTION

A first aspect of the present invention provides a vehicular lock device including: a connecting unit that connects a specific location of a vehicle to a vehicle body by locking a connecting member provided at one or the other of the specific location or the vehicle body, the connecting unit being provided at the other of the specific location or the vehicle body; a sensing unit that senses insertion of the connecting member into the connecting unit; a control unit that controls the connecting unit so as to lock the connecting member when insertion of the connecting member into the connecting unit has been sensed by the sensing unit; an estimating unit that estimates separation of the connecting member from the connecting unit when locking of the connecting member by the connecting unit has been released; and an initial state control unit that controls the connecting unit such that the connecting member is placed in a lockable initial state when the connecting member is estimated by the estimating unit to have separated from the connecting unit.

A second aspect of the present invention provides a vehicular lock device including: a connecting unit that connects a vehicle seat to a vehicle body, the vehicle seat being capable of changing between a seating state that enables an occupant to sit and a stowed state in which the vehicle seat is stowed at a specific location at the vehicle body, by locking a connecting member that connects a vehicle seat and a vehicle body and that is provided at one or the other of the vehicle seat or the vehicle body in order to maintain the stowed state when the vehicle seat is in the stowed state, the connecting unit being provided at the other of the vehicle seat or the vehicle body; a sensing unit that senses insertion of the connecting member into the connecting unit; a control unit that controls the connecting unit so as to lock the connecting member when insertion of the connecting member into the connecting unit has been sensed by the sensing unit; a detection unit that detects whether or not the vehicle seat is going to be stowed; and a prevention unit that prevents control by the control unit when it is not detected by the detection unit that the vehicle seat is going to be stowed.

BRIEF DESCRIPTION OF THE DRAWINGS

FIG. 5A is a diagram for explaining a detection unit for detecting the rotational position of a dragger motor.

FIG. 5B is a table showing states of each of the terminals of a dragger unit.

FIG. 6 is a block diagram showing the configuration of a control system of a stowable vehicle seat according to an exemplary embodiment of the present invention.

FIG. 7 is a flow chart showing an example of process flow related to unfolding and stowing a vehicle seat performed in a seat-housed ECU of a stowable vehicle seat according to an exemplary embodiment of the present invention.

FIG. 8 is a flow chart showing an example of process flow related to a dragger unit performed in a seat-housed ECU of a stowable vehicle seat according to an exemplary embodiment of the present invention.

BEST MODE OF CARRYING OUT THE INVENTION

Explanation will now be given of details of an exemplary embodiment of the present invention, with reference to the drawings.

Figure 1A:
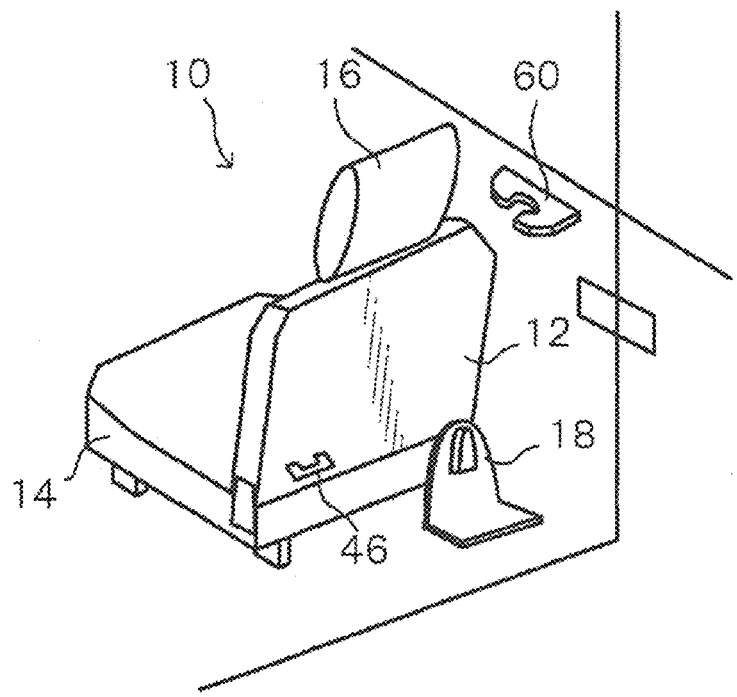
FIG. 1A is a perspective view showing a stowable vehicle seat, to which a stowable vehicle seat lock device according to an exemplary embodiment of the present invention has been applied, in an unfolded state.

FIG. 1 are drawings showing vehicle-installed states a stowable vehicle seat, to which a stowable vehicle seat lock device according to an exemplary embodiment of the present invention has been applied.

A stowable vehicle seat 10 according to the exemplary embodiment of the present invention is applied to seating at the back of a vehicle (third seats, for example). The stowable vehicle seat is stowable to the side of the vehicle, as shown in FIG. 1C, from the opened state allowing sitting thereon, shown in FIG. 1A.

Figure 1B:
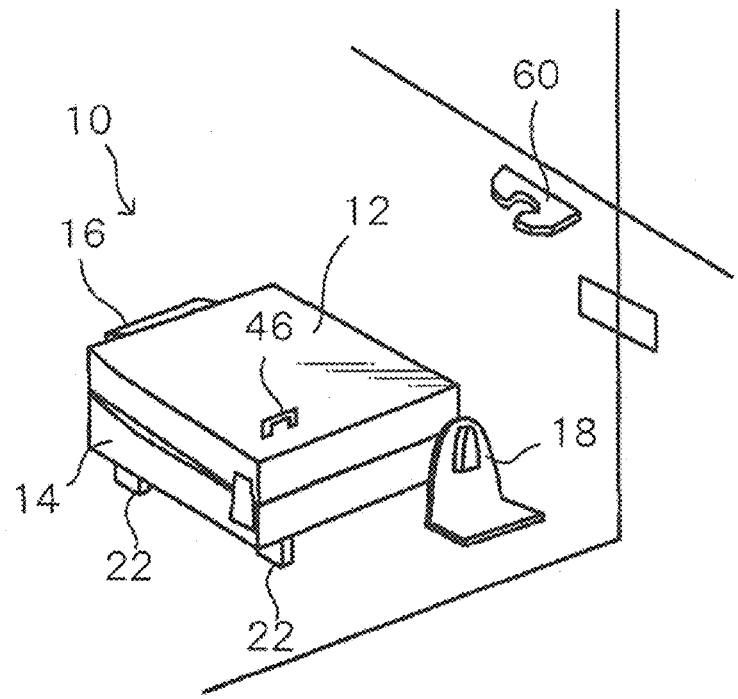
FIG. 1B is a diagram showing a stowable vehicle seat, to which a stowable vehicle seat lock device according to an exemplary embodiment of the present invention has been applied, part-way through stowing.
Figure 1C:
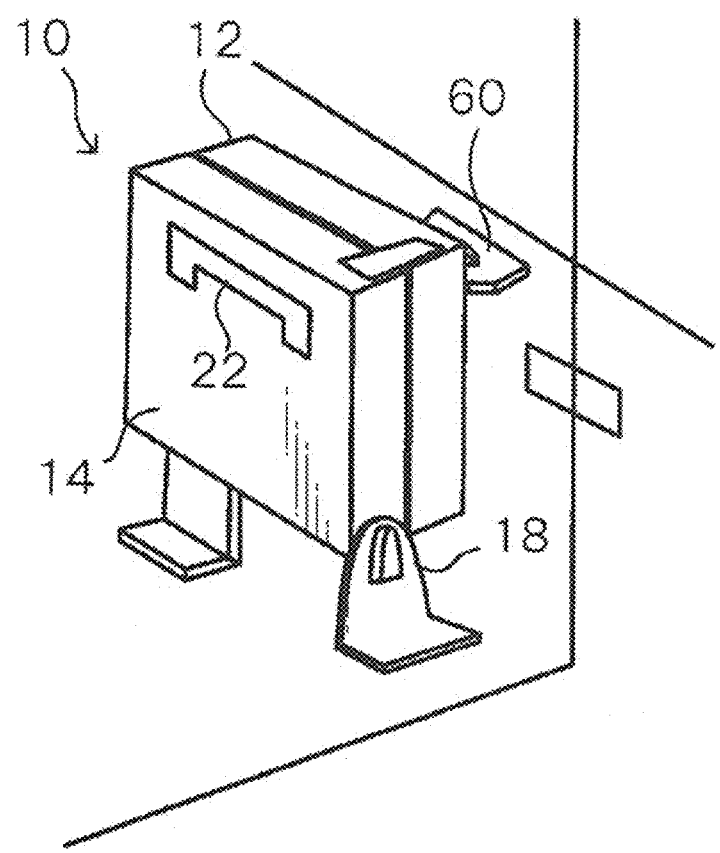
FIG. 1C is a diagram showing a stowable vehicle seat, to which a stowable vehicle seat lock device according to an exemplary embodiment of the present invention has been applied, in a stowed state.

Stowing of the stowable vehicle seat 10 is accomplished by folding a seat back 12 to a position superposed on a seat cushion 14, as shown in FIG. 1B, then rotating the seat cushion 14 about a center of rotation along an edge of the seat cushion 14 perpendicular to the center of fold axis of the seat back 12, so as to be stowed toward the vehicle body side, as shown in FIG. 1C.

FIG. 2 are two-dimensional diagrams showing the configuration of the retractable vehicle seat 10.

Figure 2A:
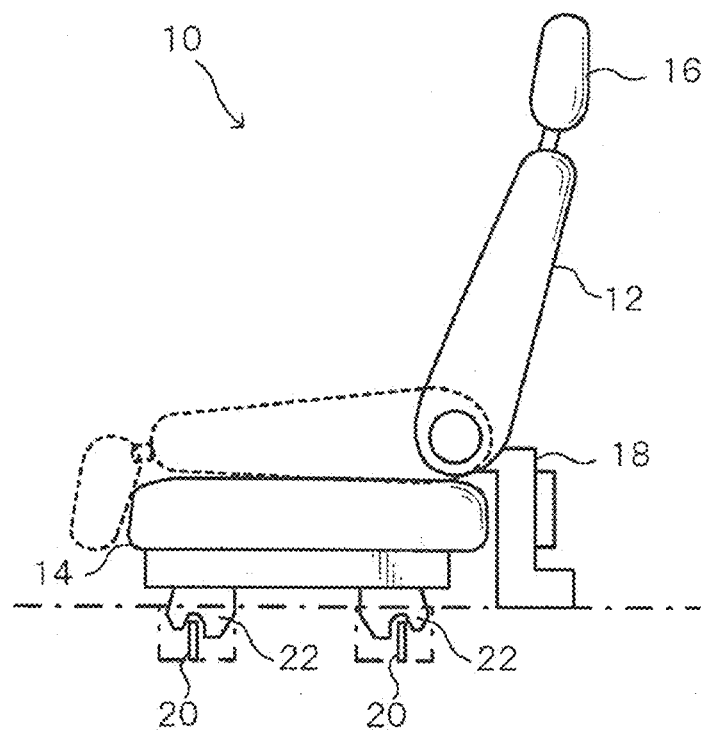
FIG. 2A is a side view for explaining the configuration of a stowable vehicle seat.
Figure 2B:
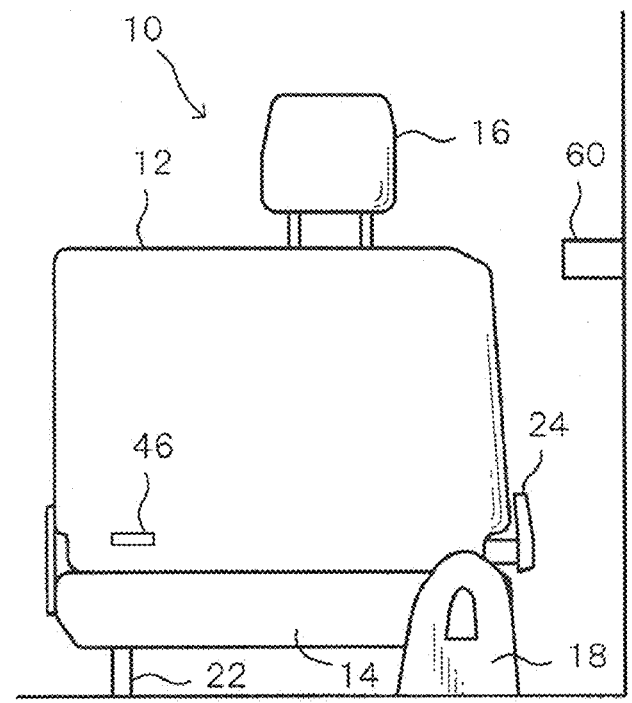
FIG. 2B is a diagram for explaining the configuration of a stowable vehicle seat when unfolded.
Figure 2C:
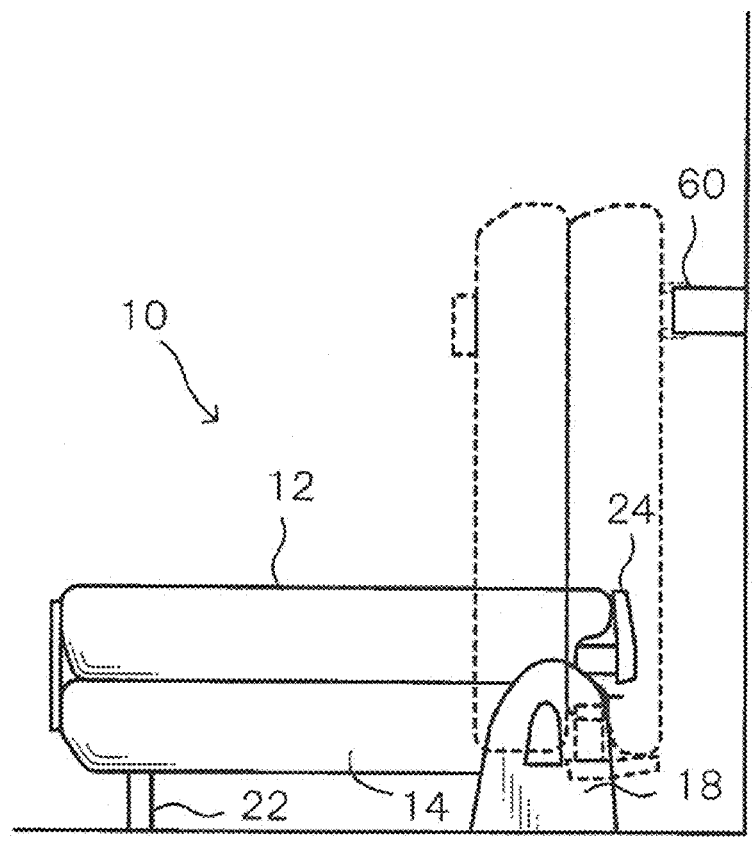
FIG. 2C is a diagram for explaining the configuration of a stowable vehicle seat when stowed.

In the stowable vehicle seat 10, a portion at the bottom edge of the seat back 12 is connected to the seat cushion 14 through a reclining device 24, as shown in FIGS. 2A to 2C. The seat back 12 is also configured so as to fold down by folding toward the vehicle front to a position superposed on the seat cushion 14. When this occurs, a headrest 16 also folds down by folding toward the vehicle front, decreasing the amount by which the headrest 16 protrudes toward the vehicle front in the state in which the seat back 12 is superposed on the seat cushion 14.

The reclining device 24 is provided with a non-illustrated biasing member (for example, a spiral spring) that biases the seat back 12 to tilt forward relative to the seat cushion 14, and with a lock mechanism that maintains the seat back 12 at a given angle relative to the seat cushion 14. When the lock mechanism is in the released state and there is no load on the seat back 12, the reclining device 24 folds the seat back 12 down to the seat cushion 14 side by biasing force of the biasing means. However, when a rearward force exceeding the biasing force of the biasing means acts on the seat back 12 in the lock released state, the seat back 12 tilts toward the rear side relative to the seat cushion 14.

The stowable vehicle seat 10 is also provided with a lift-up unit 18 that rotates the stowable vehicle seat 10 about an edge of the seat cushion 14 along the vehicle front-rear direction, and lifting the seat cushion 14 up. The stowable vehicle seat 10 is lifted up to the vehicle body side by the lift-up unit 18, as shown in FIGS. 1C to 2C.

A floor lock 22 is provided at the seat cushion 14 at the opposite side to that of the lift-up unit 18 (on the vehicle-center side), and the floor lock 22 engages with a lock striker 20 provided at the floor panel. The stowable vehicle seat 10 is fixed to the floor panel by the floor lock 22 engaging with the lock striker 20.

When the stowable vehicle seat 10 is lifted up toward the vehicle body side by the lift-up unit 18, a dragger unit 60 provided at the vehicle body side connects to a striker 46 provided at the back face of the seat back 12. The stowable vehicle seat 10 is fixed in a stowed state to the vehicle seat by the dragger unit 60.

Figure 3:
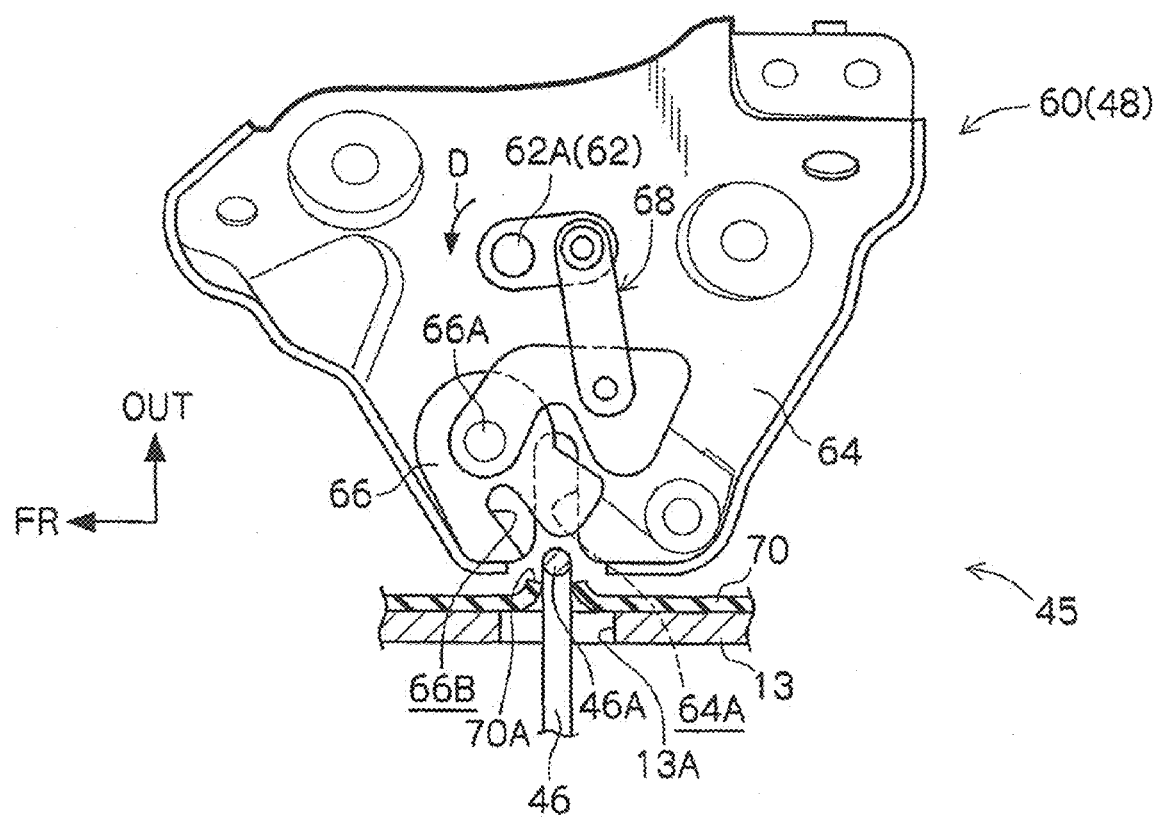
FIG. 3 is a diagram for explaining the configuration of a dragger unit.

The dragger unit 60 can, for example, utilize the mechanism of a known trunk closer, back door closer or the like. The dragger unit 60 is, as shown in FIG. 3, provided with a support bracket 64 fixed to the vehicle body, and a cut-out portion 64A is formed to the support bracket 64, opening toward the inside in the vehicle width direction. The cut-out portion 64A enables retraction of a latched portion 46A of a striker 46 along the vehicle width direction.

A latch 66 is supported by the support bracket 64 so as to be rotatable about a support shaft 66A. A cut-out portion 66B is formed to the latch 66, enabling displacement of the latched portion 46A to be inserted into and retracted from the cut-out portion 64A as the latch 66 swings about the support shaft 66A. A crank mechanism 68 is also provided at the support bracket 64, for changing and transmitting rotation of a dragger motor 62 into swinging of the latch 66. Configuration is thereby made in the dragger unit 60 such that the latch 66 swings with a reciprocal movement due to rotation of a rotation shaft 62A of the dragger motor 62 in one direction (the direction of arrow D shown in FIG. 3), displacing the position in which the cut-out portion 66B and the cut-out portion 64A are superposed along the cut-out portion 64A length direction.

Figure 4A:
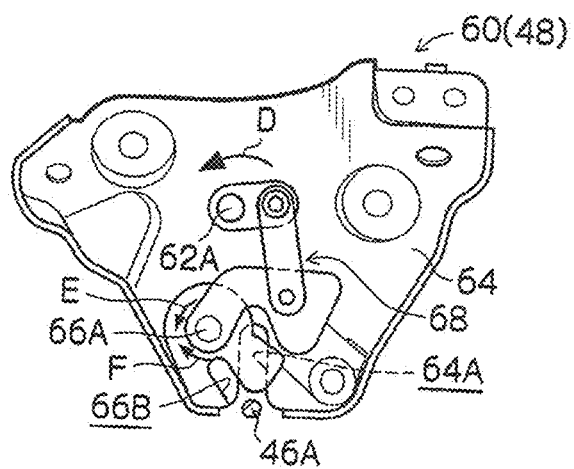
FIG. 4A is a diagram for explaining the operation of a dragger unit.

Namely, the dragger unit 60 prevents the latched portion 46A from coming out of the cut-out portion 64A by drawing the latched portion 46A of the striker 46 into both the cut-out portions 64A and 66B, thereby retaining the stowable vehicle seat 10 on the vehicle body. More specifically, in the state in which the latched portion 46A of the striker 46 is positioned in the position latchable by the latch 66, as shown in FIG. 4A, when the rotation shaft 62A of the dragger motor 62 is rotationally driven in the direction of arrow D, the latched portion 46A inserted into the cut-out portion 66B is pulled toward the back of the cut-out portion 64A, as shown in FIG. 4B, as the latch 66 rotates in the direction of arrow E.

Figure 4B:
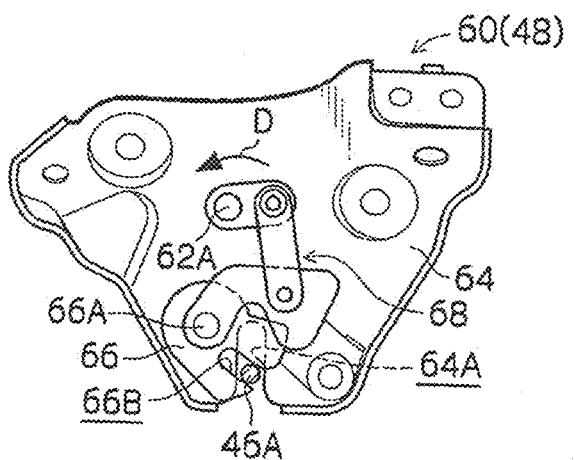
FIG. 4B is a diagram for explaining the operation of a dragger unit.
Figure 4C:
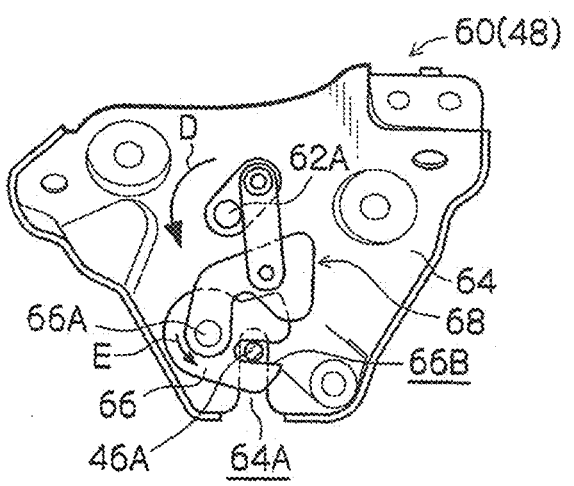
FIG. 4C is a diagram for explaining the operation of a dragger unit.
Figure 4D:
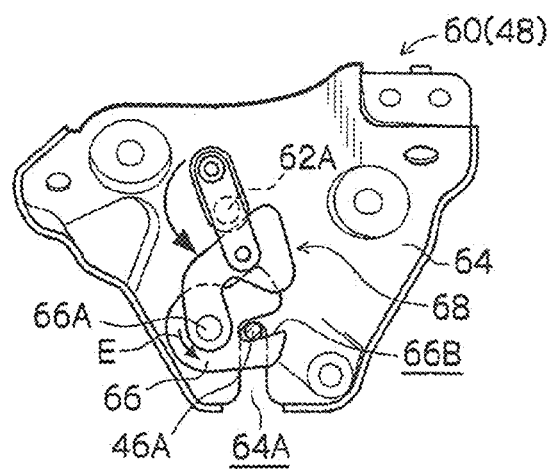
FIG. 4D is a diagram for explaining the operation of a dragger unit.
Figure 4E:
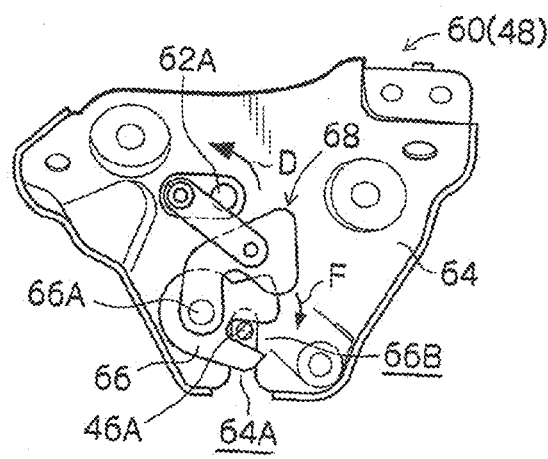
FIG. 4E is a diagram for explaining the operation of a dragger unit.

When the latch 66 rotates further in the direction of arrow E from the half-latched position, shown in FIG. 4B, the fully-latched position is arrived at with the latch 66 substantially orthogonal to the cut-out portion 64A, as shown in FIG. 4C, and when the latch 66 rotates even further in the direction of arrow E from this fully-latched position, the latched portion 46A arrives at the most drawn-in position, positioned in the vicinity of the deepest portion of the cut-out portion 64A, as shown in FIG. 4D. The latch 66 positioned in this most drawn in position is then rotated in the direction of arrow F, the opposite direction to the direction of arrow E caused by rotation of the dragger motor 62 in the direction of arrow D, and the latched portion 46A is slightly returned toward the opening of the cut-out portion 64A by this slight rotation of the latch 66 in the direction of arrow F, to the position shown in FIG. 4E, the drawing-in operation complete position.

Figure 4F:
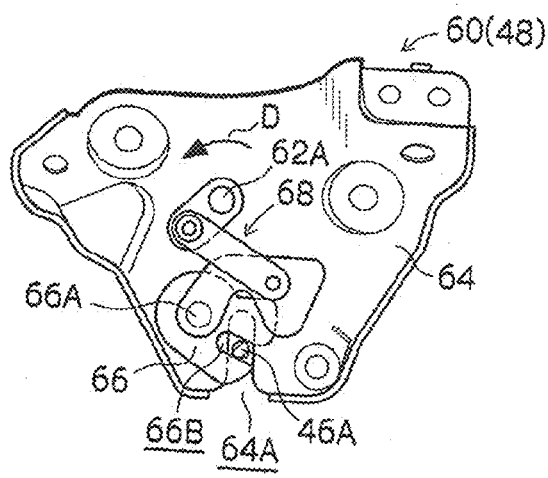
FIG. 4F is a diagram for explaining the operation of a dragger unit.
Figure 4G:
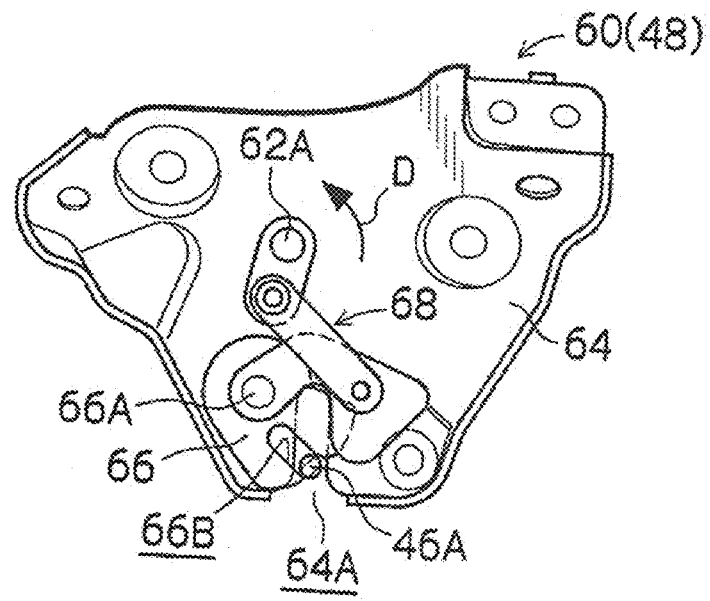
FIG. 4G is a diagram for explaining the operation of a dragger unit.
Figure 4H:
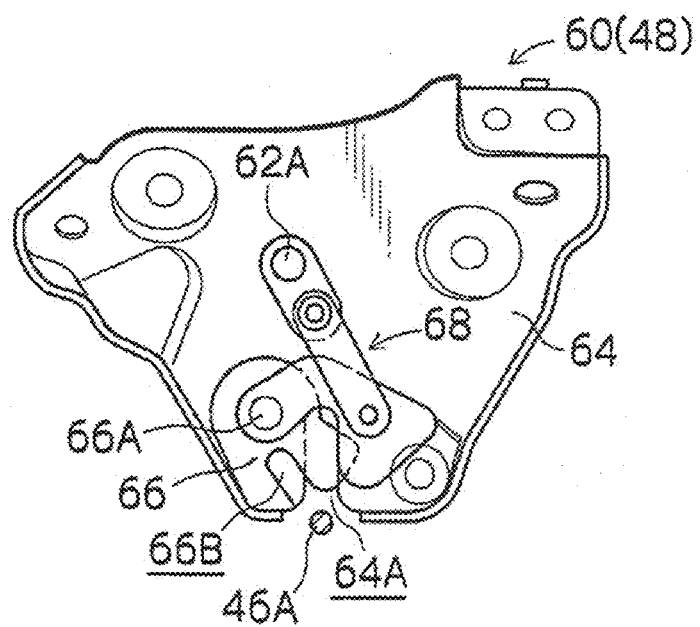
FIG. 4H is a diagram for explaining the operation of a dragger unit.

In the dragger unit 60, from the state of being positioned in the drawing-in operation complete position the latched portion 46A is pushed out (released) toward the opening of the cut-out portion 64A, by rotation of the rotation shaft 62A of the dragger motor 62 in the direction of arrow D, and by rotation of the latch 66 in the direction of arrow F, as shown in FIG. 4F and FIG. 4G. The latched portion 46A thereby becomes free to exit the cut-out portion 66B, as shown in FIG. 4H. When the latched portion 46A is separated from the cut-out portion 66B of the latch 66 by actuation of the lift-up unit 18, the rotation shaft 62A of the dragger motor 62 is rotated slightly in the direction of arrow D, returning to the latch ready position (initial position) of the latched portion 46A, as shown in FIG. 4A.

FIG. 5A is a diagram for explaining a detection unit that detects the rotational position of the dragger motor 62.

A printed circuit board 32 is provided at the rotation shaft 62A of the dragger motor 62, as shown in FIG. 5A, and the printed circuit board 32 has a contact shape 30 formed so as to be capable of detecting the rotational position of the dragger motor 62. The printed circuit board 32 rotates along with rotation of the rotation shaft 62A of the dragger motor 62.

There are three contacts E, OPN, and CLS provided so as to oppose the contact shape 30. Contact E is in continuous contact with the contact shape 30 of the printed circuit board 32 and is earthed, the contact OPN and the contact CLS switch on and off according to the contact shape 30 of the printed circuit board 32, and the rotational position of the dragger motor 62, namely the lock state, is detectable from the on-off state of the contacts OPN, CLS.

A CTY switch 34 is provided at the dragger unit 60 that detects insertion of the striker 46 into the cut-out portion 66B. The CTY switch 34 is configured so switch on and off according to swinging of the latch 66, and the CTY switch 34 switches off when the striker 46 is inserted into the cut-out portion 66B and the latch 66 swings. Insertion of the striker 46 can thereby be detected. It should be noted that while in the present exemplary embodiment a mechanical limit switch or the like is used, there is no limitation thereto, and various types of switch are applicable, such as optical switches.

In the present exemplary embodiment, each of the terminals switch on and off according to the state (initial position, close-start position, close-complete position, open-start position, open-complete position) of the dragger unit 60 accompanying rotation of the dragger motor 62, as shown in FIG. 5B.

FIG. 6 is a block diagram showing the configuration of a control system of the stowable vehicle seat 10 according to an exemplary embodiment of the present invention.

In the stowable vehicle seat 10 according to the exemplary embodiment of the present invention, movement of the stowable vehicle seat 10 to the stowed position and to the unfolded position (sitting enabled position) is controlled by a seat-housed ECU 40.

A switch 42 is connected to the seat-housed ECU 40 that instructs stowing or unfolding of the stowable vehicle seat 10. The stowing and unfolding operations of the stowable vehicle seat 10 are controlled by operation of the switch 42 by an occupant. For example, the switch 42 may be configured to be capable of operation to instruct release, instruct stowing, instruct unfolding or the like of the lock mechanism of the reclining device 24, and an indicator such as a lamp may be provided at the switch 42, so as to illuminate or flash according to a switch indicator signal output from the seat-housed ECU 40.

A meter-indicator 44 is also connected to the seat-housed ECU 40, so that an occupant is notified when the stowable vehicle seat 10 is moving, and notified of any abnormal operation or the like by the meter-indicator 44, such as a lamp.

A back-latch motor 48, a floor-latch motor 50, a stowing-motor 52 and the dragger motor 62 are also connected to the seat-housed ECU 40. The back-latch motor 48 unlocks the lock mechanism on the above-mentioned reclining device 24 that folds the seat back 12 into the superposed position on the seat cushion 14. The floor-latch motor 50 engages the lock striker 20, provided at the floor panel, with the floor lock 22. The stowing-motor 52 is provided at the lift-up unit 18 and lifts up the seat cushion 14 toward the vehicle body side. The dragger motor 62 connects the striker 46 to the dragger unit 60.

In the present exemplary embodiment the seat-housed ECU 40 drives the back-latch motor 48 according to instruction from the switch 42, releasing the lock mechanism that restricts folding of the seat back 12 to the seat cushion 14 side, and the seat back 12 is folded by the reaction force to biasing means such as a spring, tilting in the direction to fold onto the seat cushion 14. When this occurs a lock of the headrest 16 is also released, using a wire or the like, at the same time and the headrest 16 is tilting toward the vehicle front.

When in a state in which the headrest 16 is tilted over and also the seat back 12 is tilted over, the stowable vehicle seat 10 is then lifted up toward the vehicle body side by the seat-housed ECU 40 driving the stowing-motor 52. Then when the stowable vehicle seat 10 has arrived at the stowed position at the vehicle body side, the striker 46 of the seat back 12 of the stowable vehicle seat 10 is connected to the dragger unit 60 and locked, by driving the dragger motor 62.

In order to detect each of this chain of movements, a reclining position switch 54, a floor-lock switch 56, the CTY switch 34, an OPN switch (OPN terminal and ground terminal E) 36, a CLS switch (CLS terminal and ground terminal E) 38, a Hall IC 58, and a buzzer 70 are also connected to the seat-housed ECU 40.

The reclining position switch 54 is provided at the folding portion of the seat back 12 and the seat cushion 14 and detects the angle of the seat back 12 to the seat cushion 14, outputting the detected result to the seat-housed ECU 40.

The floor-lock switch 56 is provided within the floor lock 22, and detects engagement of the lock striker 20 provided at the floor panel with the floor lock 22, outputting the detection result to the seat-housed ECU 40.

The CTY switch 34 detects insertion of the striker 46 into the cut-out portion 66B and outputs the detection result to the seat-housed ECU 40.

The OPN switch 36 and the CLS switch 38 detect the rotational position of the dragger motor 62, namely the lock state, outputting the detection result to the seat-housed ECU 40.

The Hall IC 58 detects rotation of the stowing-motor 52, outputting the detection result to the seat-housed ECU 40.

The buzzer 70 generates a warning noise when the stowable vehicle seat 10 is being operated for stowing or operated for unfolding, as instructed by the seat-housed ECU 40.

Explanation will now be given of the operation of the stowable vehicle seat 10 under control of the seat-housed ECU 40.

First, when stowing of the stowable vehicle seat 10 is instructed by an occupant operating the switch 42, the seat-housed ECU 40 receives the stowing-signal of the switch 42 and controls the back-latch motor 48, releasing the locking mechanism of the reclining device 24. The seat back 12 is thereby tilted over to the seat cushion 14 side by biasing force from the biasing means.

When the seat back 12 has been tilted over to the seat cushion 14 side, this state is detected by the reclining position switch 54 and the detection result is output to the seat-housed ECU 40. The seat-housed ECU 40 receives the detection result of the reclining position switch 54 and drives the floor-latch motor 50. The engagement of the lock striker 20 with the floor lock 22 is thereby released.

When engagement of the lock striker 20 with the floor lock 22 has been released, this state is detected by the floor-lock switch 56, and the detection result is output to the seat-housed ECU 40. The seat-housed ECU 40 receives the detection result of the floor-lock switch 56 and generates a warning noise from the buzzer 70 as well as driving the stowing-motor 52. The stowable vehicle seat 10 is thereby lifted up toward the vehicle body side.

When the stowable vehicle seat 10 has been lifted up toward the vehicle body side, the striker 46 on the back face of the seat back 12 is inserted into the cut-out portion 64A of the dragger unit 60, switching off the CTY switch 34, with this off-signal output to the seat-housed ECU 40. The seat-housed ECU 40 receives the off-signal of the CTY switch 34 and drives the dragger motor 62, ceasing driving the dragger motor 62 when the CLS switch 38 has been switched on. The dragger unit 60 is thereby locked.

However, when unfolding of the stowable vehicle seat 10 is instructed by an occupant operating the switch 42, the seat-housed ECU 40 receives the unfold-signal from the switch 42 and drives the dragger motor 62, ceasing driving the dragger motor 62 when the OPN switch 36 has been switched on. The locking of the dragger unit 60 is thereby released.

When the locking of the dragger unit 60 has been released, the seat-housed ECU 40 generates a warning noise from the buzzer 70 as well as driving the stowing-motor 52. The stowable vehicle seat 10 is thereby set down from the vehicle body side to the seating position, the lock striker 20 is engaged with the floor lock 22, switching the floor-lock switch 56 on. The sitting enabled state is arrived at by an occupant raising the seat back 12.

When the stowing-motor 52 is driven and a given number of pulses are detected by the Hall IC 58, the seat-housed ECU 40 drives the dragger motor 62, and the dragger motor 62 is moved to the initial position.

However, the dragger unit 60 of the present exemplary embodiment is one applicable to use in a truck, back door or the like, and when the CTY switch 34 switches off a locking operation is initiated. Hence, for example, if a foreign object is inserted and the CTY switch 34 switches off, the dragger motor 62 might operate and pull in the foreign object.

However, in the present exemplary embodiment, the dragger motor 62 is driven after detecting whether or not the stowable vehicle seat 10 is going to be stowed. Namely, driving of the dragger motor 62 is prohibited when the stowable vehicle seat 10 is not going to be stowed.

Detection as to whether or not the stowable vehicle seat 10 is going to be stowed is made, in the present exemplary embodiment, by detecting whether or not the stowable vehicle seat 10 is going to be stowed based on detection of whether or not the floor-lock switch 56 is off. Namely, when stowing of the stowable vehicle seat 10 is instructed by the switch 42, the floor-lock switch 56 is switched off by movement prior to actuation of the dragger unit 60, and so determination can be made therefrom as to whether or not the stowable vehicle seat 10 is going to be stowed. It should be noted that while detecting whether or not the stowable vehicle seat 10 is going to be stowed is performed by the floor-lock switch 56 there is no limitation thereto. For example, determination whether or not the stowable vehicle seat 10 is going to be stowed may be made when a seated occupant is detected by a seating sensor or the like provided at the seat cushion. Alternatively detecting whether or not the stowable vehicle seat 10 is going to be stowed may be detected using various other sensors or the like When the dragger unit 60 of the present exemplary embodiment becomes in the state described above in which the latched portion 46A is free to exit from the cut-out portion 66B of the latch 66, when the striker 46 separates from the dragger unit 60, the dragger unit 60 returns to the initial position. However, if at this stage the striker 46 is not separated from the dragger unit 60, then after the dragger motor 62 has been driven and moved back to the initial position, the CTY switch 34 switches off and locking operation is reinitiated. In order to address this issue, the present exemplary embodiment drives the dragger motor 62 from when the striker 46 is estimated to separate from the dragger unit 60, returning the dragger unit 60 to the initial position.

In more detail, estimation of separation of the dragger unit 60 from the striker 46 is estimated by detecting whether or not the dragger motor 62 has been driven and the striker 46 has separated from the dragger unit 60 by counting the number of pulses from the Hall IC 58 for detecting rotation of the stowing-motor 52. In the present exemplary embodiment, determination is made that the striker 46 has separated from the dragger unit 60 when a pre-determined number of pulses (a number of pulses required to separate the striker 46 from the dragger unit 60) has been detected by the Hall IC 58. It should be noted that while estimation of the separation of the striker 46 from the dragger unit 60 is made in the present exemplary embodiment by detection of the number of pulses of the stowing-motor 52 using the Hall IC 58, there is no limitation thereto. For example, estimation of separation of the striker 46 from the dragger unit 60 may also be accomplished by detecting the duration of time required for the striker 46 to separate from the dragger unit 60.

Next, explanation will now be given of processing performed in the seat-housed ECU 40 of the stowable vehicle seat 10 according to the present exemplary embodiment of the invention, configured as described above. Flow charts are shown in FIGS. 7 and 8 of examples of process flows performed by the seat-housed ECU 40 of the stowable vehicle seat 10 according to the present exemplary embodiment of the invention. FIG. 7 is of processing related to unfolding and stowing the stowable vehicle seat 10, and FIG. 8 is of processing related to the dragger unit 60. Explanation will be given of the flow chart shown in FIG. 7, as processing initiated when the switch 42 has been operated, and the flow chart shown in FIG. 8, as processing initiated when power source of a battery mounted to the vehicle has been connected.

First, at step 80, determination is made as to whether or not unfolding of the stowable vehicle seat 10 has been instructed. This determination is determined on whether or not the switch 42 has been operated to instruct unfolding of the stowable vehicle seat, and when this is the case the routine proceeds to step 82, when not the case the routine proceeds to step 92 on the basis that stowing of the stowable vehicle seat 10 has been instructed.

At step 82 determination is made as to whether or not the lock of the dragger unit 60 has been released, and this determination is on standby until an on state of the OPN switch 36 is detected in processing related to the dragger unit 60 described below, when the routine then proceeds to step 84.

At step 84 the stowing-motor 52 is actuated in the direction to unfold the stowable vehicle seat 10 and the routine proceeds to step 86. Note that, the buzzer 70 issues a noise coupled to actuation of the stowing-motor 52, warning an occupant of unfolding operation of the stowable vehicle seat 10.

At step 86, determination is made as to whether or not the switch 42 is off (cancelling the unfolding instruction). When this determination is negative, the routine proceeds to step 88, and when affirmative the routine proceeds to step 90 and the stowing-motor 52 is stopped, the buzzer 70 emits a noise for 10 seconds, notification (warning) of stopping part way through the operation is made, and processing is ended. Namely, the present exemplary embodiment is configured such that unfolding operation of the stowable vehicle seat 10 is only performed for intervals when the switch 42 is operated, there is however no limitation thereto and configuration may be made so that when unfolding has been instructed by the switch 42 the stowing-motor 52 is stopped after completion of the chain of unfolding movements. Preferably in such cases a mechanism is provided for detecting jammed objects or the like and stopping the stowing-motor 52.

At step 88 determination is made as to whether or not the stowable vehicle seat 10 has rotated to the unfolded position. This determination is made by determining whether or not the floor-lock switch 56 has switched on. When this determination is negative the routine returns to step 86, and when affirmative the routine proceeds to step 90, a noise is emitted from the buzzer 70 notifying the occupant that unfolding has been completed, and the stowing-motor 52 is also stopped, completing the chain of processing.

At step 92 determination is made as to whether or not the floor lock 22 has been released. This determination is made by determination as to whether or not the floor-lock switch 56 has switched off, and this determination is on standby until affirmative determination is made, when the routine proceeds to step 94.

At step 94 the stowing-motor 52 is actuated in the direction to stow the stowable vehicle seat 10, and the routine proceeds to step 96. Note that coupled to actuation of the stowing-motor 52 the buzzer 70 emits a noise. The occupant is thereby notified of the stowing operation of the stowable vehicle seat 10.

At step 96 determination is made as to whether or not the switch 42 is off (cancelling the stowing instruction). When determination is negative the routine proceeds to step 98, and when determination is affirmative the routine proceeds to step 90 and the stowing-motor 52 is stopped, the buzzer 70 emits a noise for 10 seconds, notification of stopping part way through the operation is made, and processing is ended. Namely, the present exemplary embodiment is configured such that stowing operation of the stowable vehicle seat 10 is only performed for intervals when the switch 42 is operated, there is however no limitation thereto and configuration may be made so that when stowing has been instructed by the switch 42 the stowing-motor 52 is stopped after completion of the chain of unfolding movements. Preferably in such cases a mechanism is provided for detecting jammed objects or the like and stopping the stowing-motor 52.

At step 98 determination is made as to whether or not the stowable vehicle seat 10 has rotated to the stowed position. This determination is made by determining whether or not the CTY switch 34 has switched off. When this determination is negative the routine returns to step 96, and when affirmative the routine proceeds to step 90, a noise is emitted from the buzzer 70 notifying the occupant that stowing has been completed, and the stowing-motor 52 is also stopped, completing the processing chain.

On the other hand, in the dragger unit 60, initialization processing of the dragger motor 62 is performed at step 100.

The initialization processing of the dragger motor 62 is, for example, reverse rotating the dragger motor 62 and stopping when the initial position (FIG. 4A) is detected from the on-off state of each of the switches 42. In the present exemplary embodiment the dragger motor 62 is reverse rotated to perform initialization processing, however the dragger motor 62 may be rotated in the forward direction to perform initialization processing.

At step 102 determination is made by the seat-housed ECU 40 as to whether or not the CTY switch 34 has switched off. Namely, determination is made as to whether or not the striker 46 has intruded into the dragger unit 60 and the CTY switch 34 has been switched off. If this determination is negative the routine proceeds to step 104, and if affirmative the routine proceeds to step 118.

At step 104 determination is made by the seat-housed ECU 40 as to whether or not the floor-lock switch 56 has switched off. Namely, determination is made as to whether or not the stowable vehicle seat 10 is going to be stowed. If the determination is negative the routine proceeds to step 106, and if affirmative the routine proceeds to step 112.

At step 106 determination is made by the seat-housed ECU 40 as to whether or not a specific duration of time has elapsed. When this determination is negative the routine returns to step 104, and when affirmative the routine proceeds to step 108.

At step 108 the warning light of the meter-indicator 44 is illuminated under the control of the seat-housed ECU 40, and the routine proceeds to step 110. Namely, when the CTY switch 34 is off and the floor-lock switch 56 is on, the occupant is warned by the meter-indicator 44 since there is possibility that a foreign object has intruded into the dragger unit 60.

At step 110 determination is made by the seat-housed ECU 40 as to whether or not remedial action has been effective. In this determination the seat-housed ECU 40 determines whether or not pre-set remedial processing has been performed. Standby is continued until this determination is affirmative, and when the determination becomes affirmative, the routine then returns to step 102 and the processing described above is repeated. Namely, movement of the dragger motor 62 is not permitted when the stowable vehicle seat 10 is not going to be stowed, even if the CTY switch 34 is off, thus enabling trapping of foreign bodies in the dragger unit 60 to be prevented. Consequently, even if by chance the CTY switch 34 is switched off by the finger of an occupant, movement of the dragger motor 62 is not permitted, thereby eliminating the chance of the occupant's finger being pulled in.

On the other hand, at step 112, the dragger motor 62 is actuated under control of the seat-housed ECU 40 and the routine proceeds to step 114.

At step 114, determination is made by the seat-housed ECU 40 as to whether or not the position is that of the lock complete position. This determination is made by determining whether or not the CLS switch 38 has been switched on, with standby until this determination is affirmative, when the routine proceeds to step 116.

At step 116, the dragger motor 62 is stopped under control of the seat-housed ECU 40, and the routine proceeds to step 118.

At step 118 the seat-housed ECU 40 determines whether or not there is a lock-release instruction. This determination is made by determining whether or not an occupant has operated the switch 42 to instruct unfolding. When this determination is negative the routine returns to step 102, and the above described processing is repeated, when determination is affirmative the routine proceeds to step 120.

At step 120, the dragger motor 62 is actuated under control of the seat-housed ECU 40 and the routine proceeds to step 122.

In step 122, the seat-housed ECU 40 determines whether or not lock-release has been completed. This determination is made by determining whether or not the OPN switch 36 has been switched on, with standby until this determination is affirmative, when the routine then proceeds to step 124.

At step 124, the dragger motor 62 is stopped under control of the seat-housed ECU 40 and the routine proceeds to step 126.

At step 126, determination is made as to whether or not the striker 46 has separated from the dragger unit 60. This determination is made by determining whether or not the switch 42 has been operated, the stowing-motor 52 has been driven, and the stowable vehicle seat 10 has been set down. More specifically, the determination is made as to whether or not the number of pulses detected by the Hall IC 58 of the stowing-motor 52 is a specific number of pulses (a number of pulses required to separate the striker 46 from the dragger unit 60), with standby until determination is affirmative, whereby the routine proceeds to step 128. Namely, when the stowing-motor 52 is driven by the specific number of pulses the striker 46 separates from the dragger motor 62, and this is use for the determination. It should be noted that the determination at step 126 may be made by determining whether or not the number of pulses detected and output by the Hall IC 58 is a specific number or greater, or whether or not a pre-determined duration of time has elapsed (a period of time required for the striker 46 to separate from the dragger unit 60). Thereby, appropriate estimation of separation of the striker 46 from the dragger unit 60 can be made even when the Hall IC 58 is broken. Whether or not the striker 46 has separated from the dragger unit 60 may also be determined solely from whether or not a pre-determined duration of time has elapsed.

At step 128, the dragger motor 62 is actuated under control of the seat-housed ECU 40, and the routine proceeds to step 130. In this manner, the dragger unit 60 is moved to the initial position after separation of the striker 46 from the dragger unit 60 has been determined, enabling prevention of cases where the dragger motor 62 is actuated while the striker 46 is still inserted into the dragger unit 60, causing a locked state occur again.

At step 130, determination is made by the seat-housed ECU 40 as to whether or not the dragger motor 62 has arrived at the initial position. This determination is made by determining whether or not the OPN switch 36 has been switched on, with standby until this determination is affirmative, when the routine proceeds to step 132.

In step 132, the dragger motor 62 is stopped under control of the seat-housed ECU 40, and the routine returns to step 102 and the above described processing is repeated.

In the present exemplary embodiment such as this, when the floor-lock switch 56 is not off but a foreign object is inserted into the dragger unit 60, determination whether or not the stowable vehicle seat 10 is going to be stowed is made, and so actuation of the dragger motor 62 is not permitted. Consequently, even if an occupant mistakenly inserts their finger and the CTY switch 34 switches off, the chance of the dragger motor 62 being actuated and the occupant's finger being trapped in the dragger unit 60 is eliminated. Consequently, false operation of the dragger unit 60 due to a foreign object can be prevented with certainty.

In addition, the present exemplary embodiment is configured to drive the dragger motor 62 so as to move the latch 66 of the dragger unit 60 to the initial position when estimation is made, from the count of the number of pulses of the Hall IC 58, that the striker 46 is separated from the dragger unit 60, enabling prevention of cases where the dragger motor 62 is actuated while the striker 46 is still inserted into the dragger unit 60 (CTY switch 34 is off), causing a locked state occur again. Consequently appropriate lock operation is enabled.

It should be noted that in the above exemplary embodiment, configuration is made such that detection is made of whether or not the stowable vehicle seat 10 is going to be stowed from the on-off state of the floor-lock switch 56, however detection of whether or not the stowable vehicle seat 10 is going to be stowed is not limited thereto. For example, configuration may be made to detect whether or not the stowable vehicle seat 10 is going to be stowed by providing a seating sensor and detecting whether or not an occupant is in an unseated state. Alternatively, configuration may be made to detect whether or not the stowable vehicle seat 10 is going to be stowed by determining whether or not the seat back 12 is in a superposed state on the seat cushion 14 with the reclining position switch 54. When a seating sensor is used, in place of determining whether or not the floor-lock switch 56 is switched off, determination may be made at step 104 as to whether or not the occupant is in the unseated state by the seating sensor, and when the occupant is seated the routine proceeds to step 112. In a similar manner, when the reclining position sensor 56 is used, determination may be made at step 104 as to whether or not the seat back 12 is in a superposed state on the seat cushion 14, and when the seat back 12 is in a superposed state on the seat cushion 14 the routine proceeds to step 112.

Alternatively, configuration may be made to detect whether or not the stowable vehicle seat 10 is going to be stowed by determination from detection results or the like of the Hall IC 58 indicating whether or not the stowing-motor 52 has been driven and the stowable vehicle seat 10 has been lifted up to the vehicle body side.

Figure 9A:
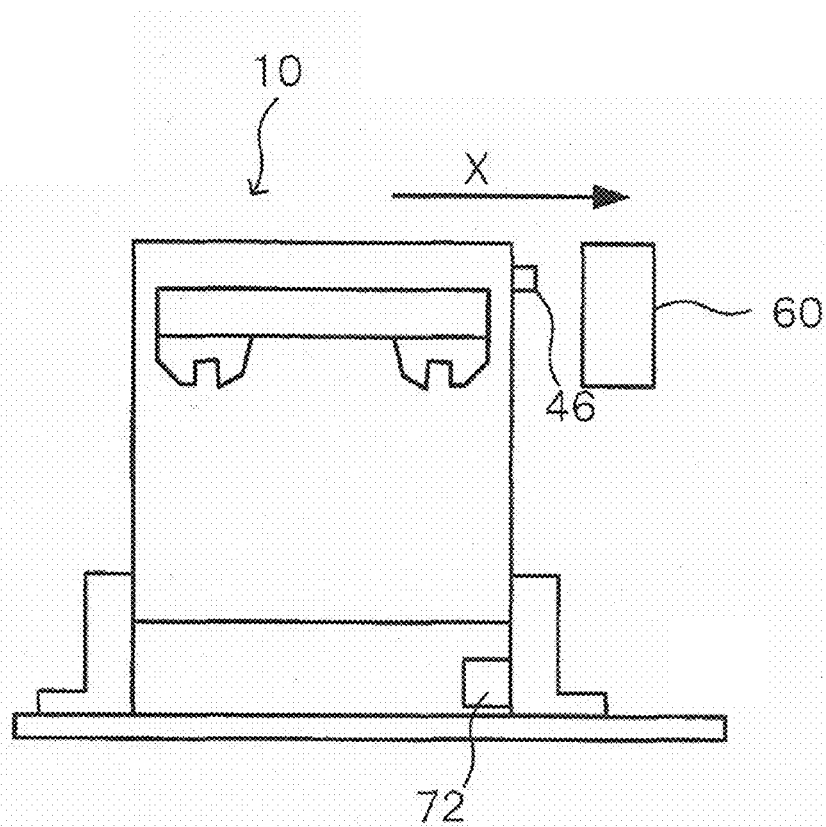
FIG. 9A is a diagram showing the configuration of another stowable vehicle seat, shown in a lifted-up state toward the vehicle body side.
Figure 9B:
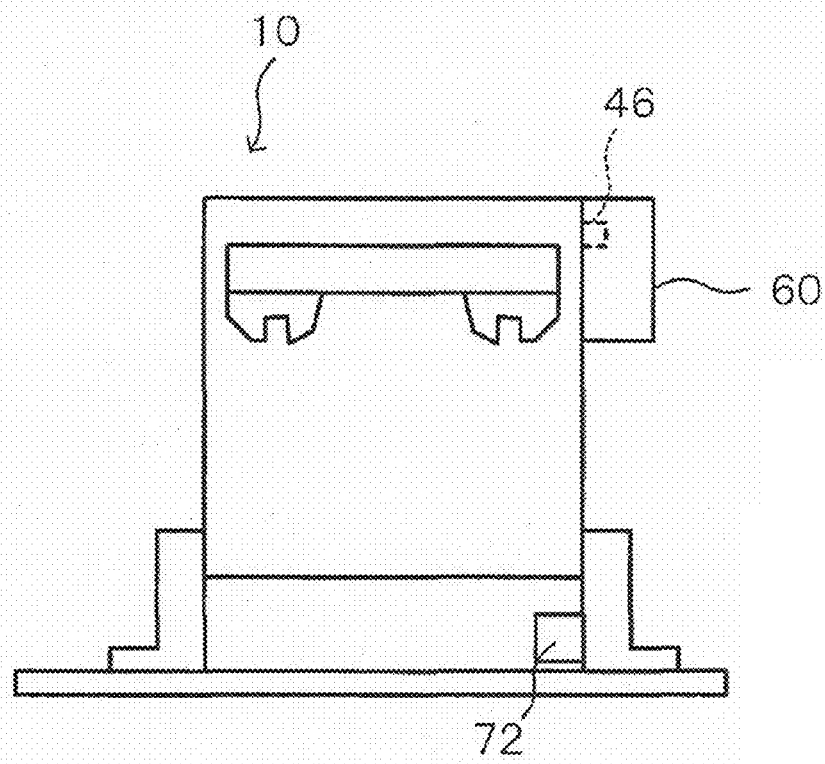
FIG. 9B is a diagram showing the configuration of another stowable vehicle seat, shown in a locked state of a dragger unit.

Also, while in the exemplary embodiment described above the stowable vehicle seat 10 is lifted up toward the vehicle body side so as to be stowed, there is no limitation thereto. For example, application may be made to a stowable vehicle seat 10 stowed in the state in which the seat back 12 is tilted toward the seat cushion 14, and provided with a rotation hinge along the vehicle width direction. Also, as shown in FIG. 9, similarly to as in the above described exemplary embodiment, the stowable vehicle seat 10 may be lifted up toward the vehicle body side (FIG. 9A), and then the stowable vehicle seat 10 slid by a motor 72 or means in the direction of arrow X in FIG. 9A (toward the vehicle front or rear), (FIG. 9B) to lock to the dragger unit 60. In the case shown in FIG. 9, estimating separation of the striker 46 from the dragger unit 60 is possible by estimation by detecting the distance of sliding movement of the stowable vehicle seat 10 using the number of pulses of the motor or a sensor or the like.

Figure 10:
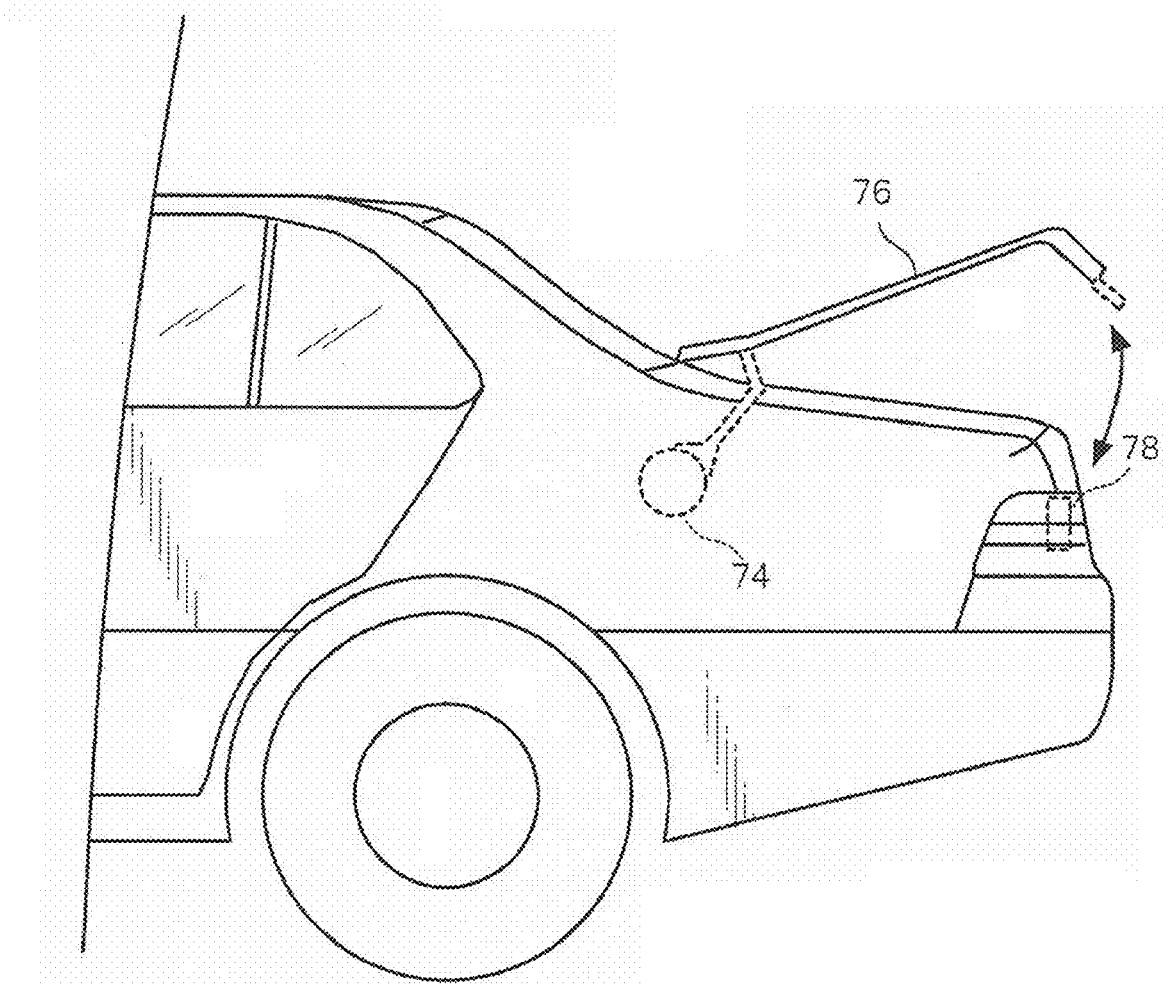
FIG. 10 is a diagram showing a schematic configuration of an electrical trunk.

In addition, explanation has been given in the above described exemplary embodiment of an example of the present invention applied to a dragger unit 60 of a stowable vehicle seat 10, however there is no limitation thereto. For example, as shown in FIG. 10, the present invention may be applied to a lock device 78 provided at an electric trunk, for opening and closing a trunk lid 76 using an actuator 74. In such a case the separation of a striker 77 from the lock device 78 can be estimated, for example, by detecting movement of the actuator 74 or the like.

The invention claimed is:

1. A vehicular lock device comprising:
   a connecting unit that connects a vehicle seat to a vehicle body, the vehicle seat being capable of changing between a seating state that enables an occupant to sit and a stowed state in which the vehicle seat is stowed at a specific location at the vehicle body, by locking a connecting member that connects the vehicle seat and the vehicle body and that is provided at one or the other of the vehicle seat or the vehicle body in order to maintain the stowed state when the vehicle seat is in the stowed state, the connecting unit being provided at the other of the vehicle seat or the vehicle body;

a sensing unit that senses insertion of the connecting member into the connecting unit;

a control unit that controls the connecting unit so as to lock the connecting member when insertion of the connecting member into the connecting unit has been sensed by the sensing unit;

an estimating unit that estimates separation of the connecting member from the connecting unit when locking of the connecting member by the connecting unit has been released; and an initial state control unit that controls the connecting unit such that the connecting member is placed in a lockable initial state when the connecting member is estimated by the estimating unit to have separated from the connecting unit, wherein the estimating unit estimates that the connecting member has separated from the connecting unit when a duration of time has elapsed after locking by the connecting unit was released, the duration of time being equal to or greater than a specific duration of time required to separate the connecting member from the connecting unit.

2. The vehicular lock device of claim 1, wherein the estimating unit comprises a detection unit that detects a movement amount of a moving unit which moves the vehicle seat, and estimates that the connecting member has separated from the connecting unit when the movement amount, which is equal to or greater than a specific amount required to separate the connecting member from the connecting unit, is detected by the detection unit.

3. The vehicular lock device of claim 1, wherein the estimating unit comprises a detection unit that detects a movement amount of a moving unit that moves the vehicle seat, and estimates that the connecting member has separated from the connecting unit when:

the movement amount, which is equal to or greater than a specific amount required to separate the connecting member from the connecting unit, is detected by the detection unit; or a duration of time has elapsed from when locking by the connecting unit was released, the duration of time being equal to or greater than a specific duration of time required to separate the connecting member from the connecting unit.

4. The vehicular lock device of claim 1, wherein the vehicle seat achieves the stowed state by a seat back folding to a position superposed on a seat cushion, and by rotating the seat cushion about a center of rotation of an edge of the seat cushion that is along a direction perpendicular to the fold center axis when folding the seat back.

5. The vehicular lock device of claim 1 wherein the connecting unit pulls in and locks the connecting member.

6. The vehicular lock device of claim 1, wherein the connecting unit comprises a drive unit that drives a lock member in order to lock the connecting member and connects the specific location to the vehicle body by driving the drive unit, the control unit controls the drive unit so as to lock the connecting member, and the initial state control unit controls the drive unit such that the initial state is adopted.

* * * * *